(12) United States Patent
Heink et al.

(10) Patent No.: US 7,751,319 B2
(45) Date of Patent: Jul. 6, 2010

(54) METHOD AND PROCESSOR FOR CLASSIFYING DATA PACKET UNITS

(75) Inventors: Matthias Heink, Munich (DE); Raimar Thudt, Munich (DE); Charles Bry, Munich (DE); Taro Kamiko, Singapore (SG); Franz-Josef Schafer, Oberhaching (DE)

(73) Assignee: Infineon Technologies AG, Munich (DE)

( * ) Notice: Subject to any disclaimer, the term of this patent is extended or adjusted under 35 U.S.C. 154(b) by 525 days.

(21) Appl. No.: 11/528,760

(22) Filed: Sep. 28, 2006

(65) Prior Publication Data

US 2007/0070900 A1    Mar. 29, 2007

(30) Foreign Application Priority Data

Sep. 29, 2005    (DE) ........................ 10 2005 046 702

(51) Int. Cl.
*H04L 12/26*    (2006.01)

(52) U.S. Cl. ........................ 370/230; 370/392; 370/416; 370/388

(58) Field of Classification Search ................ 370/392, 370/395, 389, 252, 230, 235, 416; 395/387, 395/375; 707/1
See application file for complete search history.

(56) References Cited

U.S. PATENT DOCUMENTS

| | | | | |
|---|---|---|---|---|
| 5,584,000 | A * | 12/1996 | Benschop et al. | 712/211 |
| 6,289,013 | B1 * | 9/2001 | Lakshman et al. | 370/389 |
| 6,529,508 | B1 * | 3/2003 | Li et al. | 370/392 |
| 7,154,888 | B1 * | 12/2006 | Li et al. | 370/389 |
| 2002/0051450 | A1 * | 5/2002 | Ganesh et al. | 370/389 |
| 2003/0063348 | A1 | 4/2003 | Posey, Jr. | |
| 2003/0099205 | A1 | 5/2003 | Lee et al. | |
| 2006/0239288 | A1 * | 10/2006 | Posey | 370/416 |

FOREIGN PATENT DOCUMENTS

WO    WO 00/10297    2/2000

OTHER PUBLICATIONS

Varenni et al., "Comparative Evaluation of Packet Classification Algorithms for Implementation on Resource Constrained Systems," *8th International Conference on Telecommunications—ConTEL*, Jun. 2005, pp. 135-139.
German Office Action dated Jun. 22, 2006.

* cited by examiner

*Primary Examiner*—Dang T Ton
*Assistant Examiner*—Mohamed Kamara
(74) *Attorney, Agent, or Firm*—Jenkins, Wilson, Taylor & Hunt, P.A.

(57) ABSTRACT

In a method for classifying data packet units, each comprising a group of data packet parameters which comprises a plurality of data packet parameters, a subgroup of data packet parameters for configuring a classification key is selected, the data packet units are divided into data packet classes on the basis of the classification key and a selected classification algorithm, and the data packet units are allocated to further data packet parameters which correspond to the respective data packet class.

24 Claims, 8 Drawing Sheets

FIG 6

Classification Memory

| size | content | #bits | remarks |
|---|---|---|---|
| 32 | classification key bitmap | 32 | |
| | classification method | 4 | |
| | start address=1 or 3<br>keycode for method=2 | 16 | 16 bit should cover all cases |
| | keycode bit position for method=2<br>#entries for method=1 and 3 | 5 | |
| | stacked classification indicator | 1 | |
| | continued classification indicator | 1 | |
| | | | |

FIG 7

| size | content | #bits | remarks |
|---|---|---|---|
| 32 | address | 16 | 32 bit word address |
| | width | 5 | |

| size | content | #bits | remarks |
|---|---|---|---|
| 64 | base address | 16 | 32 bit word address |
| | right shift | 5 | |
| | left shift | 5 | |
| | result interpretation | 1 | if res_int=0 then address points to a result, id res_int=1 then address points to a index which is added to the next address of the CRLT |

METHOD AND PROCESSOR FOR CLASSIFYING DATA PACKET UNITS

BACKGROUND OF THE INVENTION

The invention relates to a method and to a processor for classifying data packet units. Data networks have various switching principles, i.e. the way in which data streams are forwarded between the communication devices connected to the network.

Line detection involves the communication units being connected by connecting lines together. In this context, the subscribers are directly connected to one another after the connection has been made.

In contrast, communication involves the data which are to be transmitted being transferred on the basis of their destination address from the source node via intermediate nodes, i.e. switching centres. A special form of message transmission is what is known as packet switching. In this case, the data to be transferred are split into fragments of particular length, are provided with control information, including address information, and are sent. The addressed data fragments are called data packets or data packet units. Data networks based on packet switching technology are called packet switching networks or packet switching data networks. The data packets or data packet units (DPU) are forwarded from switching node to switching node without first needing to wait for all the data packets associated with the data record in question to be received. The data packets may also be sent from the sender to the receiver on different transmission routes. In the event of errors occurring on account of faults, packet switching technology requires only the erroneous data packet to be resent and not the entire message. Packet switching networks have a good utilization level for the connecting lines on account of the possibility for the data packet streams to be able to be routed through the network on different routes in line with the data network's load situation.

The data packets are forwarded to the data network using network processors. FIG. 1 shows a conventional network processor. The network processor firstly has input ports E and secondly has output ports A. The maximum data width of data which can be transmitted digitally by the ports is dependent on the width of the data bus. Typically, the ports are actuated by means of an associated port register. Ports can transmit data both unidirectionally and bidirectionally.

FIG. 2 shows the data format of a conventional data packet unit or of a conventional data packet. The data packet firstly comprises useful data or payload and secondly comprises data packet management data or a header.

The data packet management data or header data typically comprise a transmission protocol, a destination address DA for the data packet, a source address (SA) and possibly one or more indicator tags. The communication protocol or transmission protocol comprises agreements and conventions on the basis of which the communication between subscribers is effected. The OSI reference model is an architectural model from the International Standards Organization (ISO) for data communication in open systems OSI (Open Systems Interconnections). The OSI reference model comprises seven layers: the application layer, the presentation layer, the session layer, the transport layer, the network layer, the data link layer and finally the physical layer. Each layer has an associated transmission protocol which is compatible with the adjoining layers.

In the network layer, the data packets are transported through the network using the techniques of "switching" and "routing". The network layer also makes the logical associations for remote computers, performs the addressing, connection of various networks (Internet working), error handling, data congestion control and the categorization of data packets into data streams. In the data link layer, the transmission control for data units (frames) is effected on transmission sections between the nodes of communication networks. Known data transmission protocols include Ethernet, IP, PPP, HDLC or the ATM data transmission protocol. The quality of service QoS indicates the collective effect of a service, which determines the degree of satisfaction of a service user. Typical QoS criteria are availability, the probability of loss and error for data packets, the delay time for data packets as a result of congestion and overload phenomena in the data transmission network, the propagation time for the data packets and also their jittering, and the degree of data compression and pause suppression. The quality of service therefore refers to all factors which influence the quality of service, for example network down times, bit error rates on channels, delay times for connection setup, stability of the connection and probability of blocking. The QoS is defined in different ways for different services and networks.

The data packets arriving on the input ports of the network node or network processor are subjected to classification by the network processor. Such classifications relate inter alia to the determination of an output port, the quality of service QoS for the data packet, the identification of special data packets and also the insertion of data fields into the data packet. In the case of conventional classification methods, data packets which have certain properties or data packet parameters are handled in prioritized fashion.

Data packets have firstly data parameters with explicit indications in the data packet management data, such as destination and source addresses, and secondly implicit data packet parameters or data packet properties, such as the arrival time of the data packet on one of the input ports of the network processor or the port number of the input port.

In conventional methods for classifying data packet units, classification is effected using a data packet parameter. By way of example, the quality of service is allocated on the basis of the implicit data packet parameter "input port number". In other methods, classification is effected on the basis of indicator tags, such as a Layer-2 tag like VLAN or a Layer-3 tag like TOS. In addition, conventional methods for classifying data packet units involve the classification algorithm being prescribed and nonconfigurable.

BRIEF DESCRIPTION OF THE INVENTION

The invention provides a method for classifying data packet units which respectively have a group of data packet parameters which comprises a plurality of data packet parameters, where a subgroup of data packet parameters is selected for configuring a classification key, where the data packet units are divided into data packet classes on the basis of the configured classification key and a selected classification algorithm, where the data packet units are allocated further data packet parameters which correspond to the respective data packet class.

The data packet units may comprise data packet management data and useful data.

In one embodiment of the inventive method, the data packet parameters comprise firstly data packet parameters indicated explicitly in the data packet management data and secondly implicit data packet parameters.

The data packet units may be classified by a network processor.

In one embodiment of the inventive method, the data packet units arriving on an input port of the network processor are classified by the network processor and, following allocation of the further data packet parameters corresponding to the data packet class, are output on an output port of the network processor.

In a further embodiment of the inventive method, the data packet parameters explicitly indicated in the data packet management data from the data packet units comprise a transmission protocol for the data packet unit, a source address for the data packet unit, a destination address for the data packet unit, and also one or more indicator tags.

The implicit data packet parameters from the data packet unit may comprise, inter alia, a number for an input port on which the data packet unit arrives, a packet length for the data packet unit and an arrival time for the data packet unit.

The data packet management data and the useful data from the incoming data packet units may be separated by the network processor.

The transmission protocol for the data packet unit may be taken as a basis for extracting the remaining data packet parameters indicated explicitly in the data packet management data.

The extracted explicit data packet parameters from the data packet unit may be buffer-stored in a context memory.

In a further embodiment of the inventive method, the explicit data packet parameters buffer-stored in the context memory and the implicit data packet parameters buffer-stored in the context memory form a parameter context for the data packet unit.

A key bitmap may be used to select those data packet parameters from the parameter context which form the classification key.

A plurality of key bitmaps may respectively be stored together with an associated classification selector in a classification memory.

A key bitmap and an associated classification selector may be selected using a classification index.

In a further embodiment of the inventive method, the classification index is contained in an external function call.

The classification selector may select a classification algorithm from a group of prescribed classification algorithms.

In another embodiment of the inventive method, the prescribed classification algorithms comprise a direct classification, a linear search method, a logarithmic search method, a binary CAM method, a ternary CAM method, and a hashing method.

The classification key formed may be reduced by means of the selected classification algorithm to form a lookup index.

In another embodiment of the inventive method, the lookup index is added to a base address for addressing at least one data packet parameter stored in a reading memory or for addressing a stored pointer to a data packet parameter.

The addressed data packet parameter may be read and may be allocated to the classified data packet unit.

In one particularly preferred embodiment of the inventive method, the allocated data packet parameter comprises, inter alia, a number for an output port of the network processor, a quality of service for the data packet transmission, a VLAN-ID and a Policer ID.

In a further embodiment of the inventive method, the classification key is formed continuously or in stages.

In another embodiment of the inventive method, the classification key is formed in stages by virtue of at least one classification key which has already been formed previously forming part of the new classification key.

The invention also provides a network processor for classifying data packet units which respectively have a group of data packet parameters which comprises a plurality of data packet parameters, where a subgroup of data packet parameters can be selected for configuring a classification key, where the data packet units can be divided into data packet classes on the basis of the configured classification key and a selectable classification algorithm, where the data packet units are allocated further data packet parameters which correspond to the respective data packet class.

Preferred embodiments of the inventive method and of the inventive network processor for classifying data packet units are described below with reference to the appended figures in order to explain features which are fundamental to the invention.

BRIEF DESCRIPTION OF THE SEVERAL VIEWS OF THE DRAWINGS

FIG. 6 are data stored within the classification memory in an exemplary embodiment of the inventive method.

FIG. 7 is the data content of a key bitmap table in an exemplary embodiment of the inventive method.

DETAILED DESCRIPTION OF THE INVENTION

Figure 1:
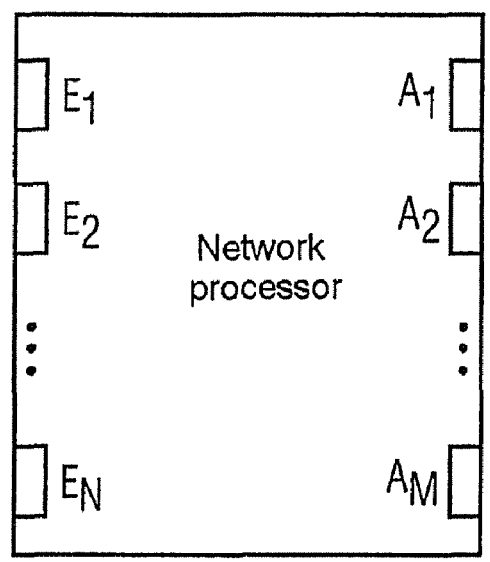
FIG. 1, as described above, is a conventional network processor.
Figure 2:
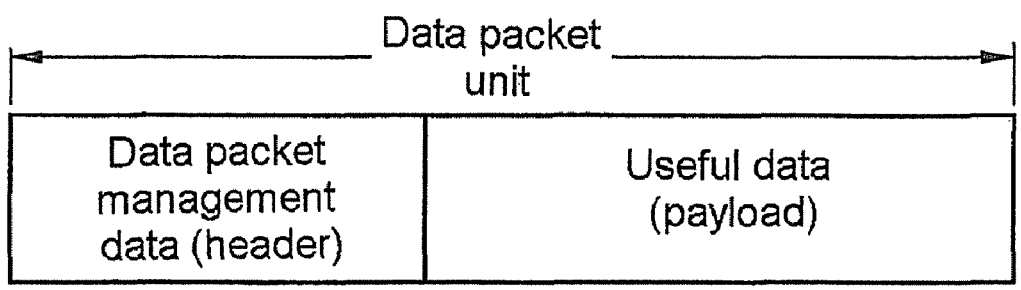
FIG. 2, as described above, is the data structure of a conventional data packet unit.
Figure 3:
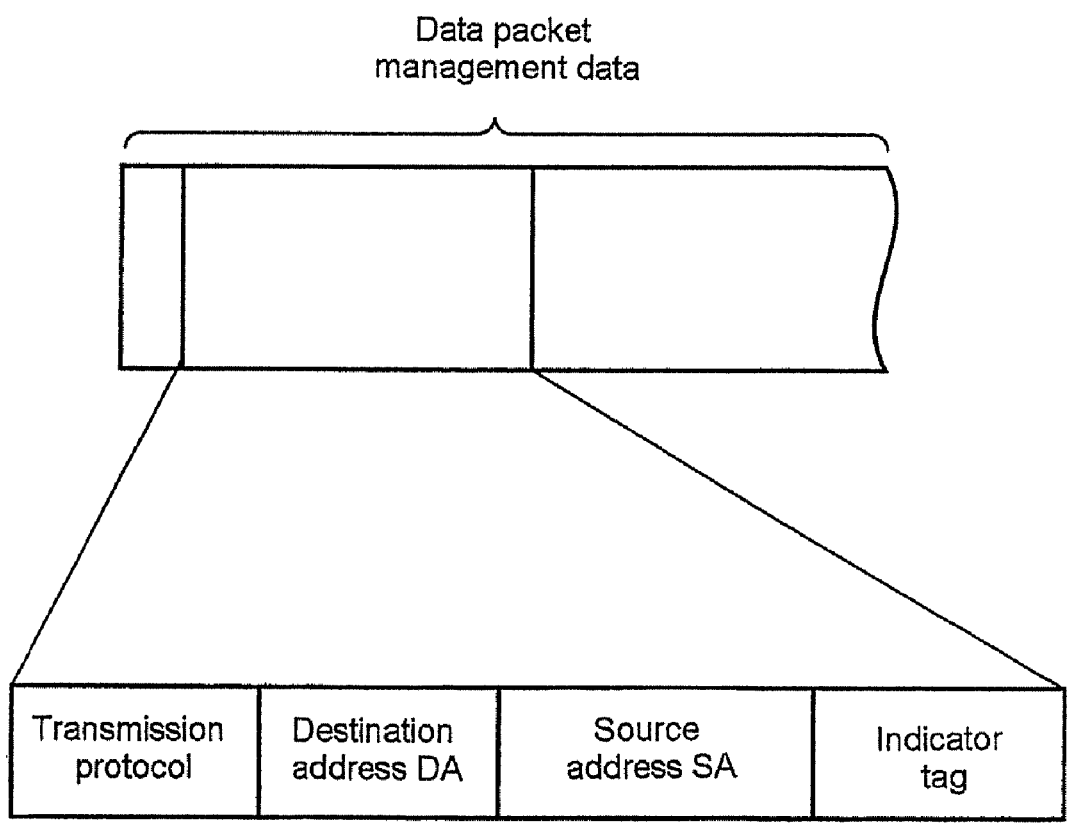
FIG. 3, as described above, is an example of the data packet management data in a data packet unit.
Figure 4:
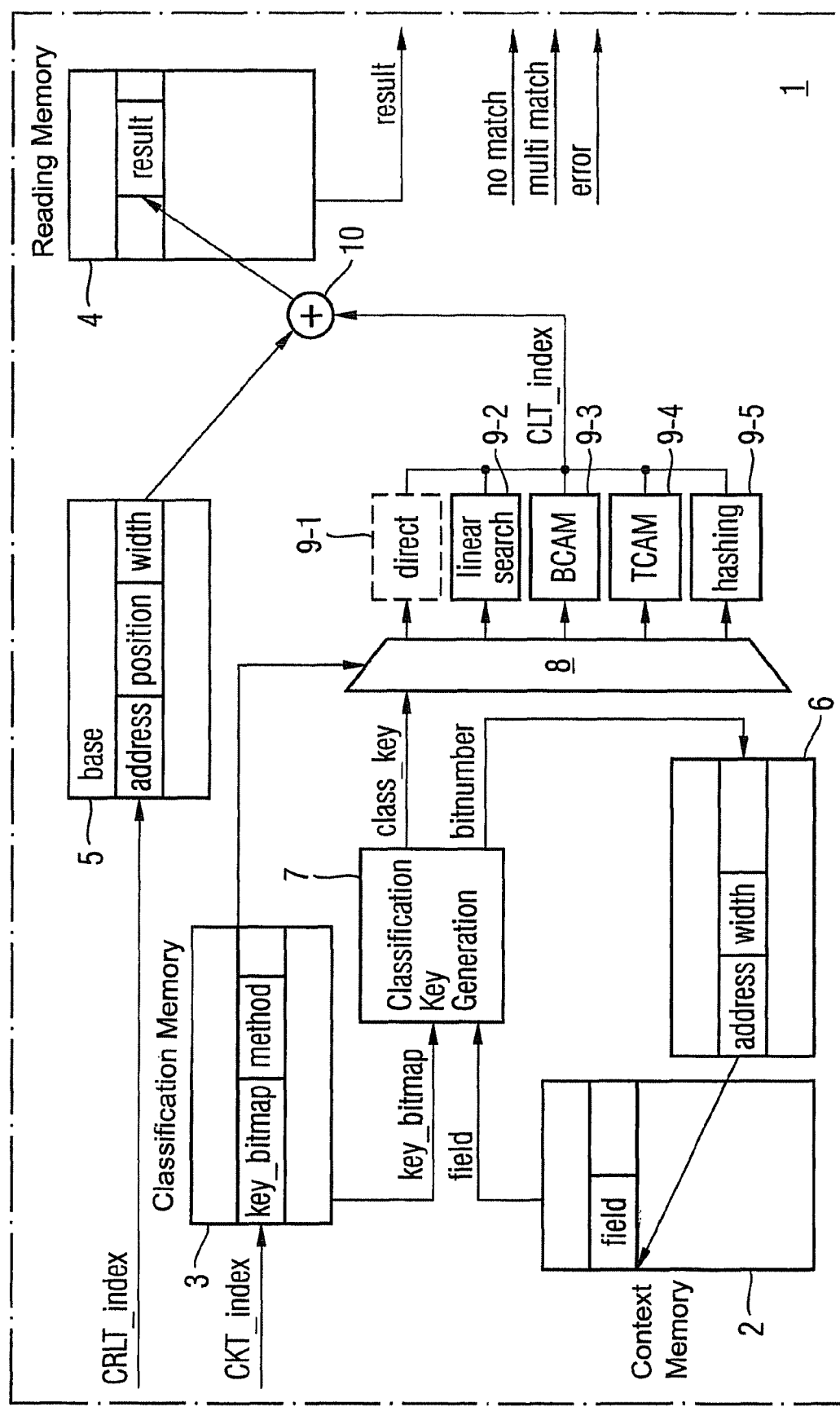
FIG. 4 is a schematic function flow diagram explaining an exemplary embodiment of the inventive method.

FIGS. 1-3 have been described in the introduction FIG. 4 shows a function flow diagram to explain the way in which a preferred embodiment of the inventive method for classifying data packet units works. The classification is made within a network processor 1, which contains the memory and computation elements shown in FIG. 4, inter alia. The network processor 1 contains a plurality of memories, namely a context memory 2, a classification memory 3 and a reading memory 4. In addition, a memory 5 for storing a table for localizing a classification result and a memory 6 for storing a table for key bitmaps are provided.

The classification memory 3 stores a plurality of key bitmaps with a respective associated classification selector for selecting a classification algorithm (method). The data content of the classification memory 3 is selected using an external classification index (CKT index). The classification index is preferably contained in an external function call. A function call involves a key bitmap and an associated classification selector (method) being read. The key bitmap is a 32-bit bit vector, for example, with all those bits which are at logic high selecting appropriate data packet parameters which are taken into account for forming the classification key. The key bitmap is thus used to select a subgroup of data packet parameters for configuring a classification key. Each data packet parameter has an associated particular bit from the bitmap key. As soon as the relevant bit in the bitmap key has been set, the data packet parameter is used for generating the classification key. If a plurality of data bits in the bitmap key have been set then the relevant data parameter fields are chained or concatenated. A classification key is formed by a computation unit 7 in the network processor 1. The classification key (class key) formed is, as shown in FIG. 4, supplied to a demultiplexer unit 8 which takes the classification selector (method) which has been read from the classification memory 3 as a basis for switching through the applied classification key (class key) to one of the downstream calculation units 9-1 to 9-$n$.

Each of the downstream calculation units 9-$i$ executes a prescribed classification algorithm for reducing the classification key formed. By way of example, the calculation unit 9-1 performs direct classification, i.e. the classification key (class key) formed is supplied to an adder 10 directly as a lookup index (CLT index). The calculation unit 9-2 performs a linear search method. The calculation unit 9-3 shown in the embodiment in FIG. 4 performs a binary CAM method, while the calculation unit 9-4 performs a ternary CAM method. The calculation unit 9-5 shown in FIG. 4 performs a hashing method. In one preferred embodiment of the inventive network processor 1, the generated classification key (class key) comprises no more than 138 bits. Since the classification key is up to 138 bits long, it cannot be used for directly addressing the reading memory 4. When required, the classification key is reduced by means of one of the calculation units 9-$i$ to a lookup index (CLT index) in order to address the reading memory 4.

Figure 5:
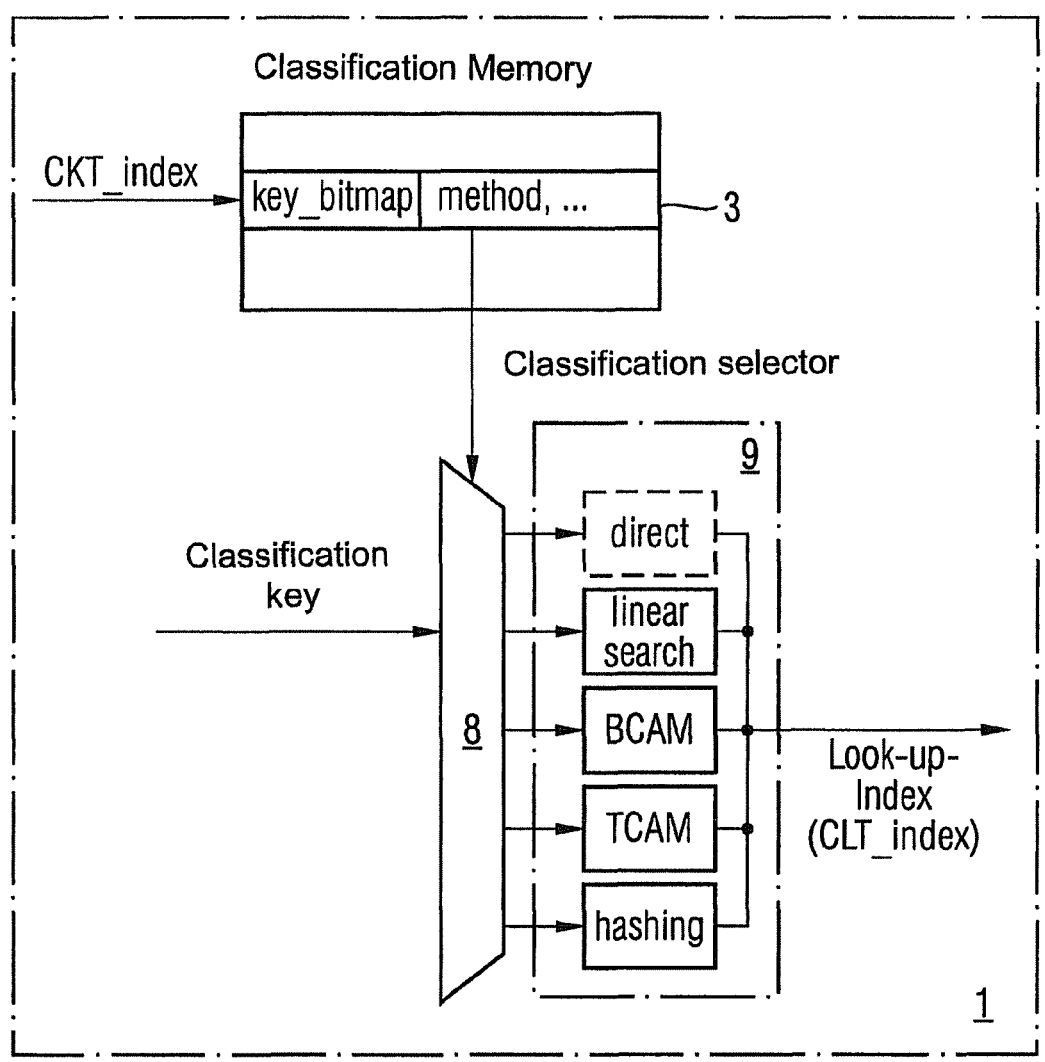
FIG. 5 is a detail view of the function flow diagram of FIG. 4.

FIG. 5 shows an appropriate detail from the function flow diagram which is shown in FIG. 4.

FIG. 6 shows the data content of the classification memory 3 for a preferred embodiment of the inventive method. In the embodiment shown in FIG. 6, the classification key bitmap stored therein comprises 32 bits for selecting data packet parameters from a group of 32 data packet parameters and with 4 bits as a classification selector for selecting the classification method.

If five classification methods are supported, for example, namely a direct classification algorithm (method=0), a linear search method (method=1), a binary CAM method (method=2), a ternary CAM method (method=3) and a hashing method (method=4), then further data bits deliver necessary information for the different classification algorithms. In addition, a flag indicates whether classification in stages or continuous classification is performed.

FIG. 7 shows the data content of the memory 6 for a preferred embodiment of the inventive method. The memory 6 stores a table. One bit in the key bitmap which is stored in the classification memory 3 corresponds to an entry in this table. The position of the bit in the key bitmap represents the index for addressing an entry in the table. In one preferred embodiment, the memory 6 therefore has 32 data entries, each data entry comprising a 16-bit address for a data field in the context memory 2 and a 5-bit statement relating to the width of an addressed data field in the context memory 2.

Upon the arrival of a data packet on a port of the network processor 1, the data packet management data (header) and the useful data (payload) are first of all separated from one another. Each data packet arriving on an input port of the network processor 1 has firstly data packet parameters indicated explicitly in the data packet management data (header) of the data packet, for example transmission protocol, source address, destination address or indicator tags, and secondly implicit data packet parameters, such as the number of the input port, the packet length of the data packet and also the arrival time for the data packet on the input port of the network processor 1. The transmission protocol for the incoming data packet unit is determined from the separated data packet management data (header). On the basis of the identified transmission protocol for the data packet unit and the associated data format for the data packet unit, the remaining data packet parameters indicated explicitly in the data packet management data are extracted. The extracted data packet parameters from the data packet unit are then buffer-stored in the context memory 2. Besides the buffer-stored explicit data packet parameters, the associated implicit data packet parameters from the incoming data packet unit, such as the number of the input port, can likewise be buffer-stored in the context memory 2. Each data packet parameter, i.e. both the implicit data packet parameters and the explicit data packet parameters, are stored in an associated data field at an address which is indicated in the memory 6 and with a bit width which is indicated in the memory 6.

Figure 8:
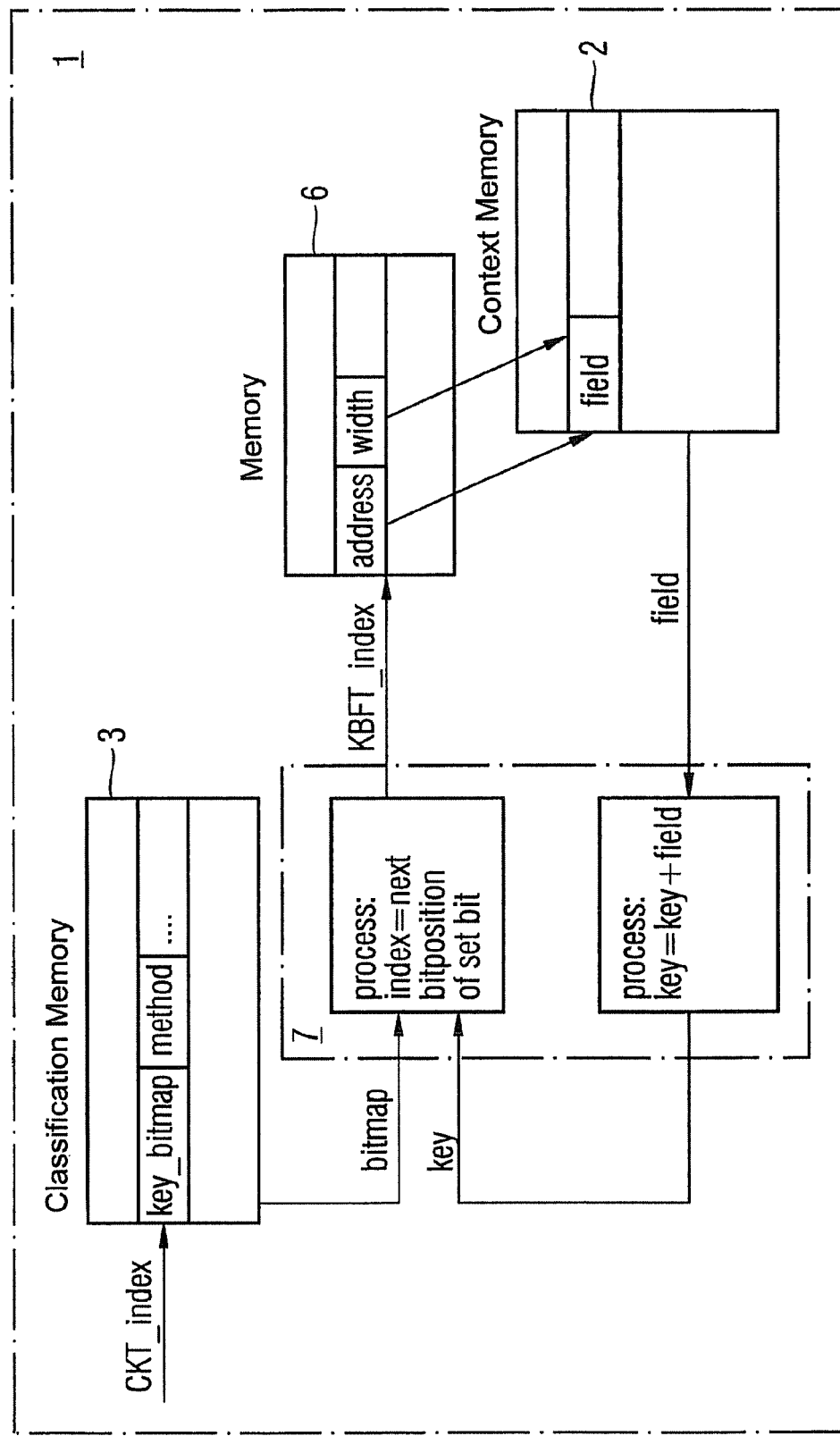
FIG. 8 is a detail view of the function diagram of FIG. 4.

As can be seen from FIG. 8, the calculation unit 7 generates a classification key in steps from those data packet parameters selected using the bitmap key.

Figure 9:
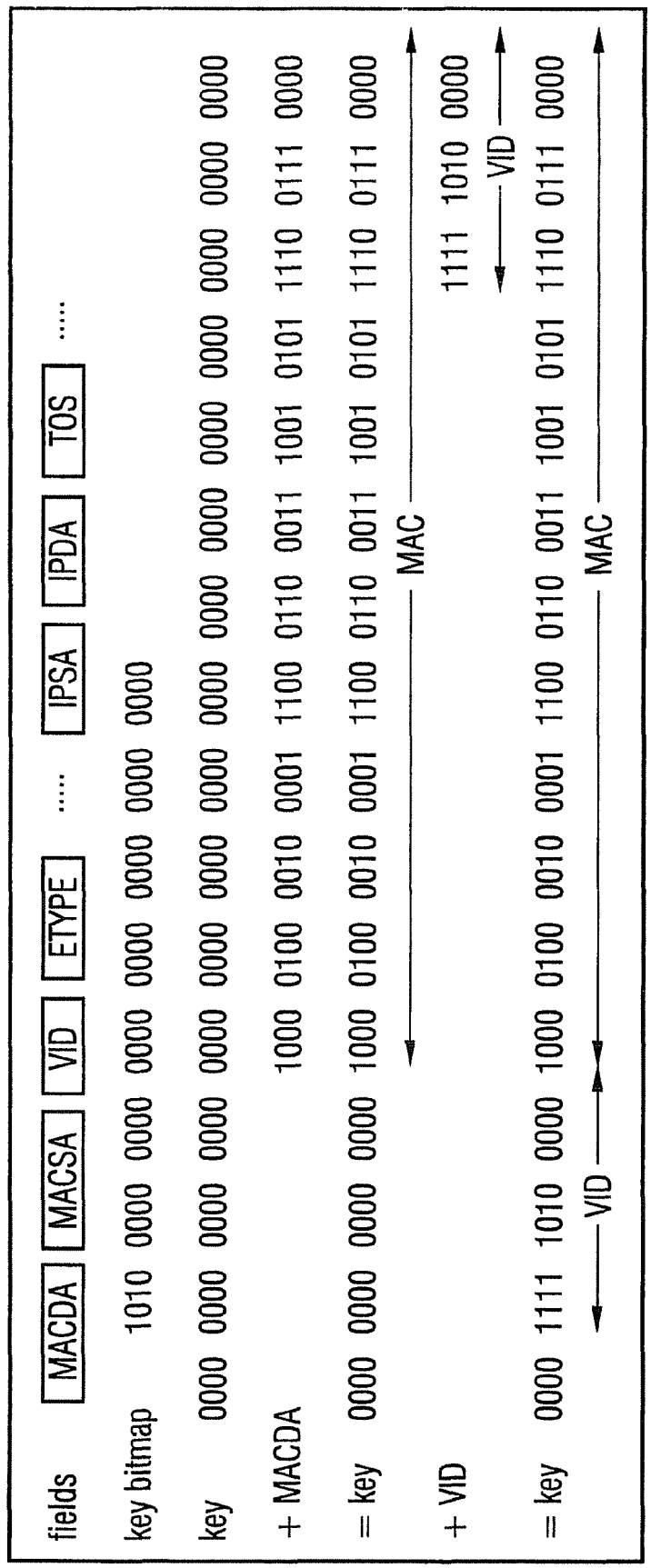
FIG. 9 is an example of the composition of a classification key based on an exemplary embodiment of the inventive method.

FIG. 9 shows an example of the formation of a classification key by a calculation unit 7. In the example indicated, the key bitmap which has been read from the classification memory 3 is used to select two data packet parameters from a plurality of data packet parameters such as destination address (MAC DA), source address (MAC SA), VID, IP source address (IP SA), IP destination address (IP DA), TOS etc., namely in one case the first data field MAC DA and the third data field VID, i.e. the classification is performed on the basis of a subgroup of data packet parameters, with the subgroup in the indicated example comprising the two data packet parameters MAC DA and VID.

To begin with, the calculation unit 7 initializes the classification key which is to be formed to 0, as can be seen in FIG. 9. In line with the key bitmap, the data content of the selected data field (MAC DA) is added. Finally, the data content of the next data field VID is appended in chained fashion in order to form the classification key. The calculation unit 7 chains together the data contents of the data packet parameters selected by the bitmap key, which are read from the context memory 2.

As soon as formation of the classification key by the computation unit 7 has concluded, the key formed is switched through to one of the calculation units 9-$i$ performing different classification algorithms on the basis of the classification selector and the demultiplexer 8, i.e. the classification key formed is reduced to a lookup index (CLT index) on the basis of the selected classification algorithm. The lookup index (CLT index) formed forms an offset address for reading a data content from the reading memory 4.

A memory 5 stores a table for reading the classification result from the reading memory 4. The table comprises a plurality of data entries which are addressed by a control index (CRLT index). The control index preferably forms part of a function call. Each data entry contains a base address for addressing a memory area within the reading memory 4. This base address is added to the generated lookup index by means of the adder 10 in order to form an address for the reading memory 4.

Figures 10, 11:
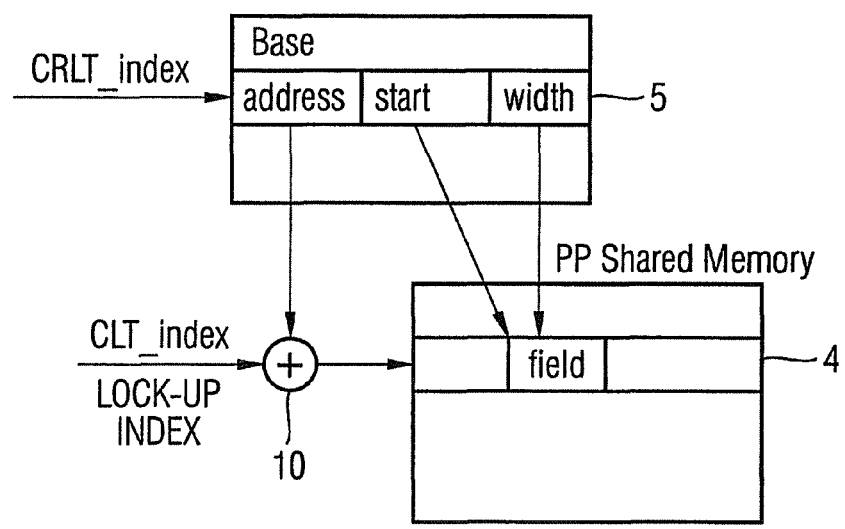
FIG. 10 is a detail view based on the function flow diagram of FIG. 4.
FIG. 11 is a table for localizing the classification result which is to be read, based on an exemplary embodiment of the inventive method.

FIG. 11 shows the data content of a memory 5 for a preferred embodiment of the inventive method. The lookup index is added to the base address in order to address at least one data packet parameter stored in the reading memory 4. In an alternative embodiment, a data packet parameter is not addressed directly, but rather a stored pointer to a data packet parameter is addressed, this being indicated by means of an indicator bit (result interpretation). For each classified data packet unit, at least one data packet parameter is read from the reading memory 4 and is allocated to the data packet unit. The allocated data packet parameter comprises the number of an output port of the network processor 1 or a quality of service for the data packet transmission, for example. The inventive method for classifying data packet units, as is shown schematically in FIG. 4, allows flexible freely configurable classification of data packets using a group of selectable data packet parameters. The inventive classification method is therefore easily changed, in line with requirements.

If a classification result comprises a plurality of parameters, these are addressed by incrementing the CRLT index.

In one preferred embodiment of the inventive method, the classification key can be formed by the calculation unit 7 continuously or in stages. If the classification key (class key) is formed in stages, at least one classification key which has already been formed previously forms part of a new classification key. In the case of classification in stages, the next entry within the classification memory 3 is processed, with the lookup index (LT) obtained being appended to the generated classification key.

In the case of continuous classification (continued classification indicator=1), the next data entry is processed as classification memory only if the preceding classification has not returned a result.

The memories shown in FIG. 4, i.e. the context memory 2, the classification memory 3, the reading memory 4 and the memories 5, 6 through the addressing, are preferably in the form of RAM stores within the network processor 1. In one preferred embodiment, the different memories 2, 3, 4, 5, 6 are located within various memory areas of the same RAM store. The calculation unit 7 is either implemented in hardware as a circuit or is produced as software by a microprocessor on the basis of an assembler or firmware program. The reduction of the classification key by the calculation units 9-*i* is also effected either in hardwired fashion or using software.

In the case of the inventive method, a data packet is classified using a plurality of criteria or data packet parameters with the option of the user's selecting various features or data packet parameters and various classification algorithms. In this context, classifications using various data packet parameters can be made among one another with different data packet features. The result of a classification may even be a feature for a subsequent classification for a data packet. Longer classification keys can be treated as a chain of individual shorter key structures.

What is claimed is:

1. A method for classifying data packet units at a network processor, each comprising a group of data packet parameters which comprises a plurality of data packet parameters, comprising the steps of:

selecting a key bitmap for selecting a subgroup of data packet parameters and an associated classification selector for selecting a classification algorithm using an external classification index of an external function call for a respective data packet unit;

configuring a classification key by chaining relevant data parameter fields of the subgroup of data packet parameters selected by the key bitmap;

reducing the classification key to a lookup index by means of the classification algorithm selected by the classification selector, the lookup index forming an offset address for addressing at least one data packet parameter stored in a reading memory; and reading the addressed at least one data packet parameter for the respective data packet unit and allocating it to the data packet unit.

2. The method of claim 1, wherein the data packet units comprise data packet management data and useful data.

3. The method of claim 2, wherein the data packet parameters comprise data packet parameters and implicit data packet parameters; the data packet parameters being indicated explicitly in the data packet management data.

4. The method of claim 1, comprising classifying the data packet units by the network processor.

5. The method of claim 4, comprising classifying the data packet units arriving on an input port of the network processor by the network processor and, following allocating further data packet parameters corresponding to a data packet class, outputting the classified data packet units on an output port of the network processor.

6. The method of claim 3, wherein the data packet parameters explicitly indicated in the data packet management data from the data packet units comprise a transmission protocol for the data packet unit, a source address for the data packet unit, a destination address for the data packet unit, and at least one indicator tag.

7. The method of claim 3, wherein the implicit data packet parameters from the data packet unit comprise an information about an input port for the data packet unit, a packet length for the data packet unit, and an arrival time for the data packet unit.

8. The method of claim 2, comprising separating the data packet management data and the useful data from the incoming data packet units by the network processor.

9. The method of claim 6, comprising separating the data packet management data and the useful data from the incoming data packet units by the network processor and determining the transmission protocol for the incoming data packet unit from the separated data packet management data.

10. The method of claim 9, comprising taking the transmission protocol for the data packet unit as a basis for extracting the remaining data packet parameters indicated explicitly in the data packet management data.

11. The method of claim 10, comprising buffer-storing the explicit data packet parameters extracted from the data packet unit in a context memory.

12. The method of claim 11, comprising buffer-storing the implicit data packet parameters of the data packet unit in the context memory.

13. The method of claim 12, wherein the explicit data packet parameters buffer-stored in the context memory and the implicit data packet parameters buffer-stored in the context memory form a parameter context for the data packet unit.

14. The method of claim 13, comprising selecting those data packet parameters from the parameter context which form the classification key utilizing the key bitmap.

15. The method of claim 14, comprising storing a plurality of key bitmaps each together with an associated classification selector in a classification memory.

16. The method of claim 15, comprising selecting a classification algorithm from a group of prescribed classification algorithms by the classification selector.

17. The method of claim 16, wherein the prescribed classification algorithms comprise a direct classification, a linear search method, a logarithmic search method, a binary computer aided mapping (CAM) method, a ternary computer aided mapping (CAM) method, and a hashing method.

18. The method of claim 14, comprising reducing the classification key to form a lookup index by means of the selected classification algorithm.

19. The method of claim 18, comprising adding the lookup index to a base address for addressing at least one data packet parameter stored in the reading memory or for addressing a stored pointer to a data packet parameter.

20. The method of claim 19, wherein the addressed data packet parameter is read and is allocated to the classified data packet unit.

21. The method of claim 20, wherein the allocated data packet parameter comprises the output port of the network processor, a quality of service for the data packet transmission, a virtual local area network identifier (VLAN ID), and a POLICY-ID.

22. The method of claim 14, wherein the classification key is formed continuously or in stages.

23. The method of claim 22, comprising forming a new classification key in stages by virtue of at least one classification key which has already been formed previously forming part of the new classification key.

24. A network processor for classifying data packet units, each comprising a group of data packet parameters which comprises a plurality of data packet parameters, the network processor comprising:
- a key bitmap for selecting a subgroup of data packet parameters and an associated classification selector for selecting a classification algorithm, the key bitmap and classification selector being selected by using an external classification index of an external function call for a respective data packet unit; and
- a classification key configured by chaining relevant data parameter fields of the subgroup of data packet parameters selected by the key bitmap, wherein the classification key is reduced to a lookup index by means of a classification algorithm selected by the classification selector, the lookup index forming an offset address for addressing at least one data packet parameter stored in a reading memory;
- wherein the addressed at least one data packet parameter is read for the respective data packet unit and allocated to the respective data packet unit.

* * * * *